US012499810B2

(12) United States Patent
Navik et al.

(10) Patent No.: US 12,499,810 B2
(45) Date of Patent: Dec. 16, 2025

(54) DYNAMIC ALLOCATION OF DISPLAY PIPES TO EXTERNAL DISPLAYS

(71) Applicant: Intel Corporation, Santa Clara, CA (US)

(72) Inventors: Ankitkumar Navik, Valsad (IN); Partha Choudhury, Portland, OR (US); Nirmala Bailur, Bangalore (IN); Sailesh Rathi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 17/684,981

(22) Filed: Mar. 2, 2022

(65) Prior Publication Data

US 2023/0282151 A1 Sep. 7, 2023

(51) Int. Cl.
*G09G 3/20* (2006.01)

(52) U.S. Cl.
CPC ....... *G09G 3/2096* (2013.01); *G09G 2360/18* (2013.01)

(58) Field of Classification Search
CPC ......................... G09G 3/2096; G09G 2360/18
See application file for complete search history.

(56) References Cited

U.S. PATENT DOCUMENTS

| | | | | |
|---|---|---|---|---|
| 2004/0061797 A1* | 4/2004 | Takahashi | H04N 23/651 348/333.01 |
| 2010/0033433 A1* | 2/2010 | Utz | G06F 1/1637 345/184 |
| 2019/0043411 A1* | 2/2019 | Chaudhari | G09G 3/2092 |
| 2021/0132769 A1 | 5/2021 | Parikh et al. | |

OTHER PUBLICATIONS

International Search Report and Written Opinion, for International Patent Application No. PCT/US2023/61534, mailed May 8, 2023, 15 pages.

Intel Corporation, "Alder Lake P/M TCSS Power Adder Pre-Release Specification," PowerPoint Presentation,. Dec. 2020, 11 pages.

* cited by examiner

*Primary Examiner* — Xin Sheng
(74) *Attorney, Agent, or Firm* — Banner & Witcoff, Ltd.

(57) ABSTRACT

Systems, apparatuses and methods may provide for technology that detects a connection of an external display to a computing system containing an internal display and activates frame buffer compression for the external display if one or more conditions are satisfied. In one example, activating frame buffer compression for the external display includes deallocating a display pipe from the internal display, wherein frame buffer compression is enabled for the display pipe, and allocating the display pipe to the external display.

19 Claims, 4 Drawing Sheets

DYNAMIC ALLOCATION OF DISPLAY PIPES TO EXTERNAL DISPLAYS

TECHNICAL FIELD

Embodiments generally relate to computing system displays. More particularly, embodiments relate to the dynamic allocation of display pipes to external displays.

BACKGROUND

Frame buffer compression (FBC) provides lossless compression of display frame buffers to save power by reducing system memory read bandwidth. In conventional notebook computing systems (e.g., laptop computers), however, FBC may be dedicated to a display pipe (e.g., power plane, ground plane, and corresponding timing generator) that is statically allocated to the internal display of the notebook computing system. In such a case, when an external USB-C (e.g., Universal Serial Bus Type-C Cable and Connector Specification, Release 2.0, August 2019, USB Implementers Forum) display is connected to the computing system, higher power consumption and reduced system performance may result.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION OF EMBODIMENTS

Frame buffer compression (FBC) is hardware technology in which display buffer data is compressed and then stored as a compressed buffer in memory. Subsequent display requests can fetch data from the compressed buffer. FBC therefore provides for lossless compression of the display frame buffer by reducing system memory read bandwidth and increasing the time between display engine read operations ("reads") to system memory. Accordingly, power consumption may be significantly reduced.

Figure 1:
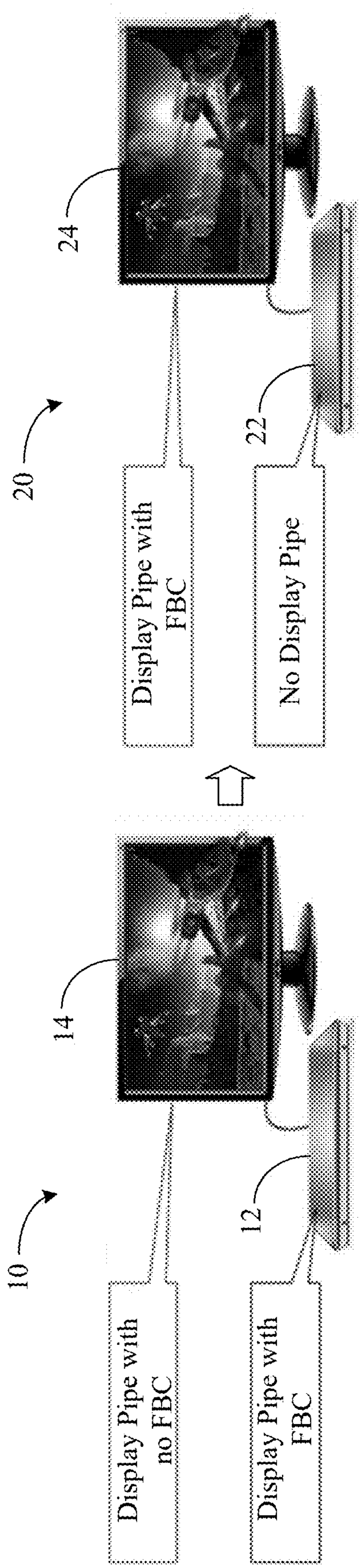
FIG. 1 is a comparative illustration of an example of a conventional computing system and an enhanced computing system according to an embodiment.

FIG. 1 shows a conventional computing system 10 (e.g., client platform) including a notebook computer 12 and an external display 14 (e.g., USB-C display). The conventional computing system 10 dedicates FBC to a display pipe (e.g., power plane, ground plane, and corresponding timing generator) that is statically allocated to an internal display (e.g., embedded DisplayPort/eDP display) of the notebook computer 12, even while the lid of the notebook computer 12 is closed (e.g., the internal display is not being used). As a result, the power saving benefits of FBC are not available to the external display 14 and suboptimal performance and/or power consumption may result.

By contrast, an enhanced computing system 20 includes a notebook computer 22 that does not statically allocate the display pipe having FBC capability to the internal display of the notebook computer 22. Rather, the notebook computer 22 dynamically detects the connection of an external display (e.g., eDP display) to the notebook computer 22 and activates FBC for the external display 24 if one or more conditions are satisfied. Accordingly, the power saving benefits of FBC are available to the external display 14 and improved performance and/or power consumption results. The enhanced computing system 20 may be extended to support FBC for multiple external displays 24 (e.g., through FBC support of multiple display pipes).

Figure 2:
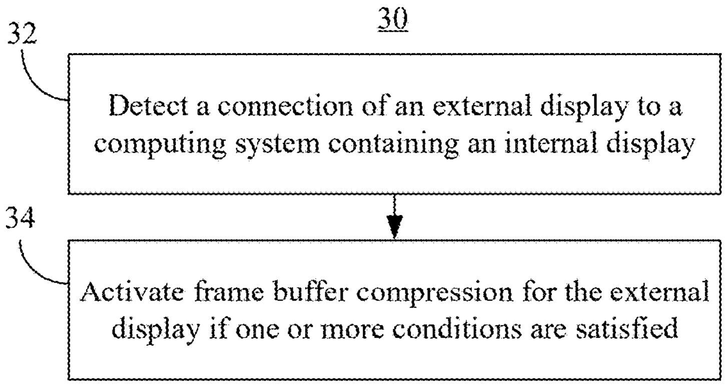
FIG. 2 is a flowchart of an example of a method of operating an operating system (OS) driver according to an embodiment.

FIG. 2 shows a method 30 of operating an operating system (OS) driver. The method 30 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations shown in the method 30 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The illustrated processing block 32 provides for detecting a connection of an external display (e.g., USB-C display) to a computing system containing an internal display. Block 32 may involve detecting a hot plug event and/or conducting an enumeration procedure (e.g., in conjunction with a system boot). Block 34 activates frame buffer compression for the external display if one or more conditions are satisfied. As will be discussed in greater detail, the condition(s) may include a lid of the computing system being closed, a resolution of the external display being greater than a resolution of the internal display, frame buffer compression being supported by the external display, and so forth. Block 34 may also involve confirming that FBC is supported by the external display based on, for example, billboard class information associated with the external display. Additionally, block 34 may include deallocating a display pipe from the internal display, wherein FBC is enabled for the display pipe, and allocating the display pipe to the external display. The method 30 therefore enhances performance at least to the extent that dynamically activating FBC for the external display reduces system memory read bandwidth, increases the time between display engine reads to system memory and/or reduces power consumption.

Figure 3:
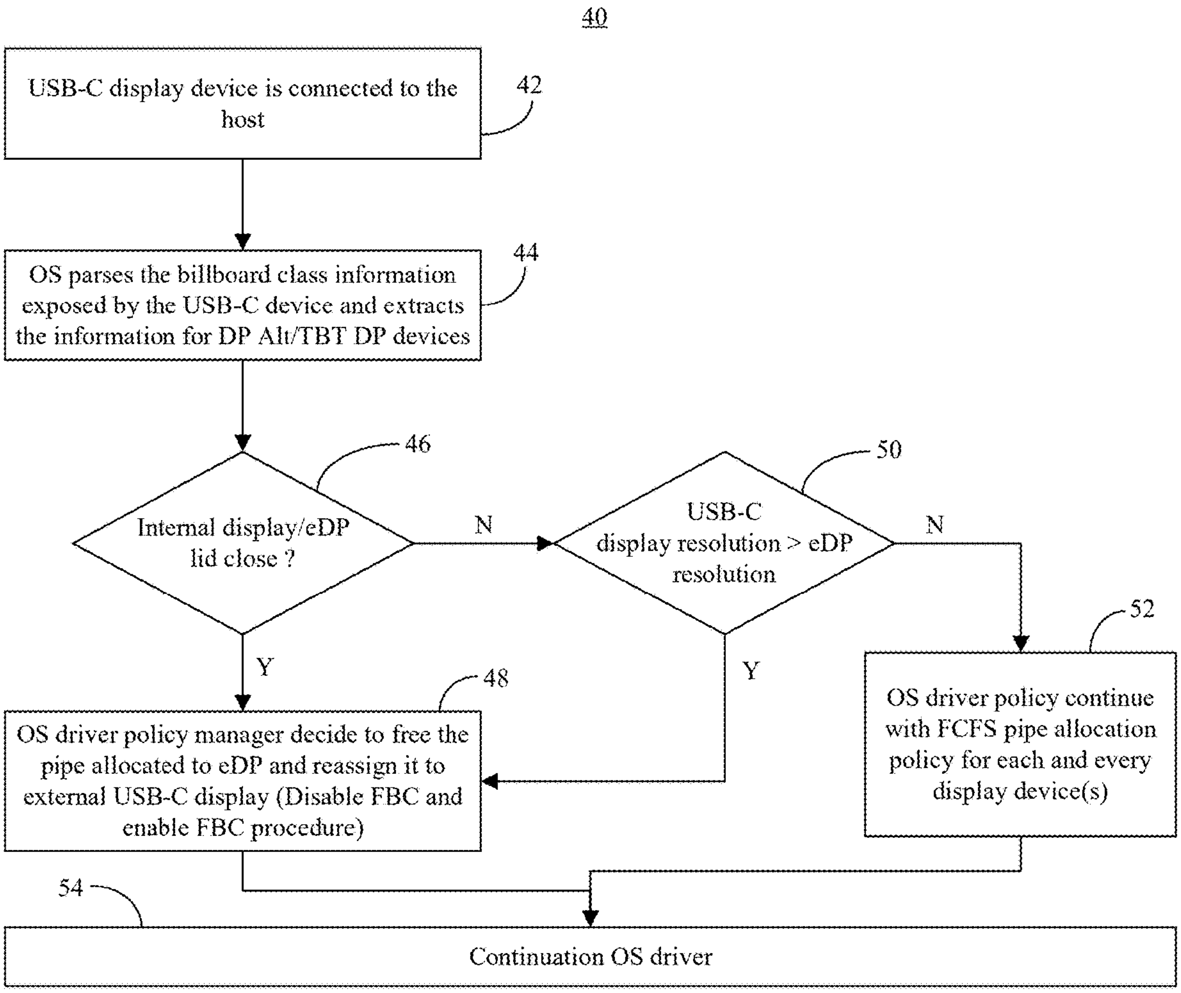
FIG. 3 is a flowchart of an example of a more detailed method of operating and OS driver according to an embodiment.

FIG. 3 shows a more detailed method 40 of operating an OS driver. The method 40 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated block 42 detects that a USB-C display device is connected to the host. The OS parses billboard class information at block 44, wherein the billboard class information is exposed by the USB-C display device. Additionally, block 44 may extract the billboard class information for DisplayPort Alternate (DP Alt) mode and/or THUNDERBOLT DisplayPort (TBD DP) mode. A determination is made at block 46 as to whether the eDP (e.g., internal) display lid is closed. If so, the OS driver policy manager decides at block 48 to free the display pipe allocated to the eDP display and reassigns the freed display pipe to the external USB-C display (e.g., via a disable FBC and enable FBC procedure, to be described in greater detail).

If it is determined at block 46 that the eDP display lid is not closed, block 50 determines whether the USB-C display resolution is greater than the eDP display resolution. If so, the method 40 proceeds to block 48. In this regard, giving FBC priority to the display with the greater resolution enables increased system on chip (SoC) power savings, deeper sleep states (e.g., package C-states), and reduced display memory consumption. Otherwise, the OS driver policy continues with a first come first served (FCFS) pipe allocation policy for the display devices. The method 40 then continues with remaining OS driver operations at block 54.

Figure 4:
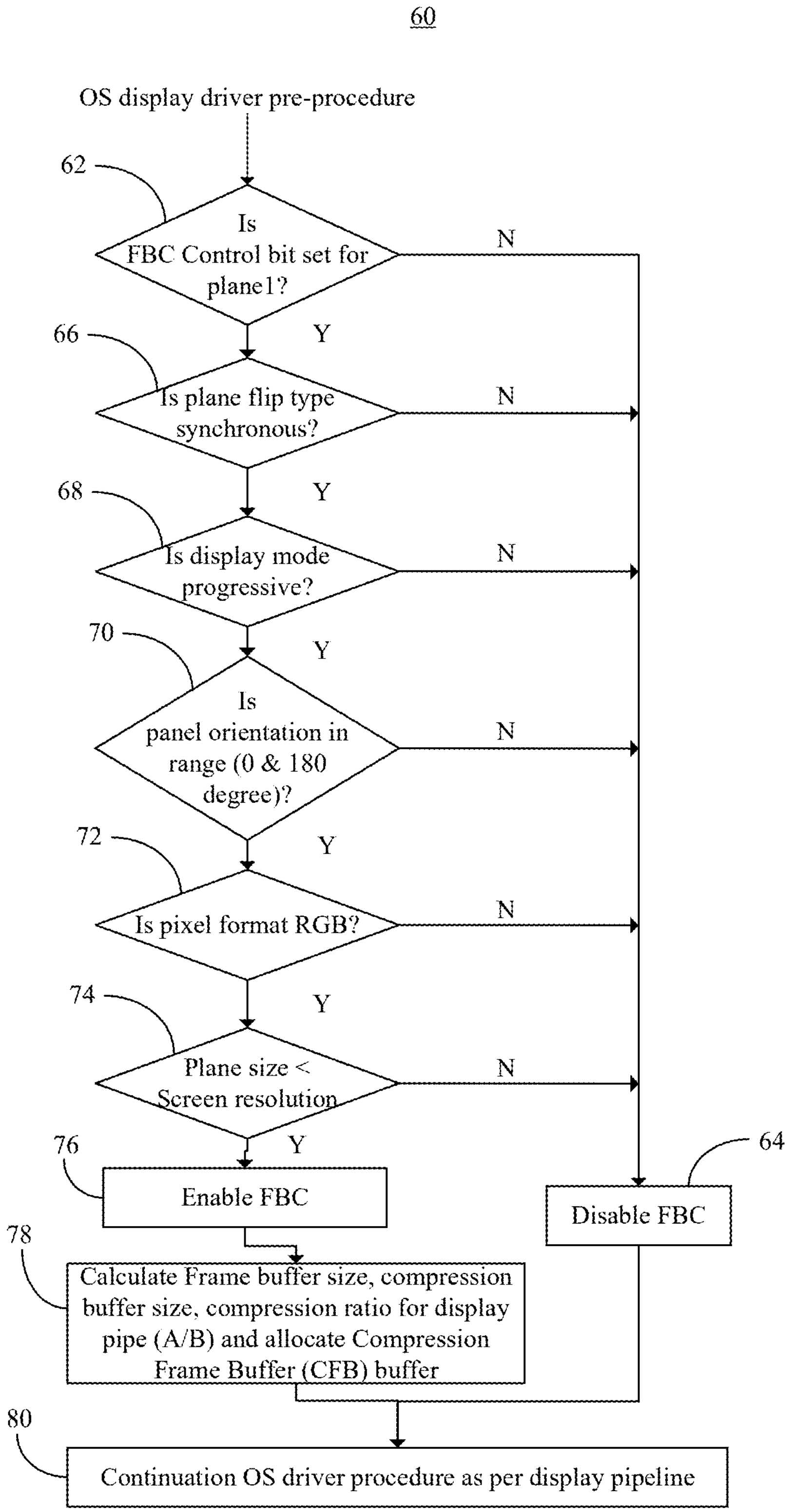
FIG. 4 is a flowchart of an example of a method of enabling and disabling frame buffer compression (FBC) according to an embodiment.

FIG. 4 shows a method 60 of enabling and disabling FBC. The method 60 may generally be incorporated into block 34 (FIG. 2), already discussed, to confirm that FBC is supported by the external display based on, for example, billboard class information associated with the external display. More particularly, the method 60 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated block 62 determines whether an FBC control bit is set for a designated plane (e.g., Plane 1). If not, block 64 disables FBC. Otherwise, block 66 determines whether the plane flip type is synchronous. If not, the method 60 proceeds to block 64. Otherwise, block 68 determines whether the display mode is progressive. If not, the method 60 proceeds to block 64. Otherwise, block 70 determines whether the panel orientation is in a designated range (e.g., 0° to 180°). If not, the method 60 proceeds to block 64. Otherwise, block 72 determines whether the pixel format is RGB (red, green, blue). If not, the method 60 proceeds to block 64. Otherwise, block 74 determines whether the plane size is less than the screen resolution. If not, the method 60 proceeds to block 64. Otherwise, block 76 enables FBC and block 78 calculates the frame buffer size, the compression buffer size, the compression ratio for the display pipe (e.g., Pipe A, Pipe B), and allocates the compression frame buffer (CFB). The method 60 then continues the OS driver procedure (e.g., as per the display pipeline) at block 80.

Figure 5:
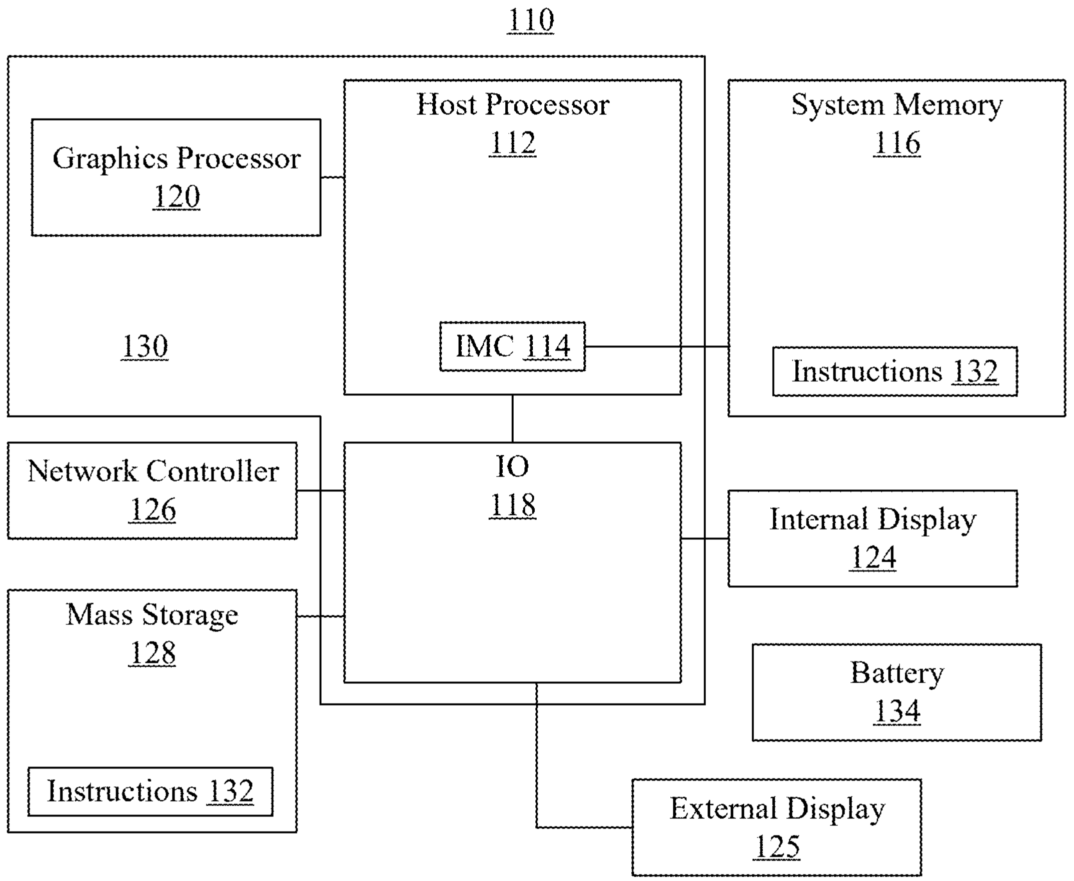
FIG. 5 is a block diagram of an example of a performance-enhanced computing system according to an embodiment.

Turning now to FIG. 5, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 110 includes a host processor 112 (e.g., central processing unit/CPU) having an integrated memory controller (IMC) 114 that is coupled to a system memory 116. In an embodiment, an IO module 118 is coupled to the host processor 112. The illustrated IO module 118 communicates with, for example, an internal display 124 (e.g., touch screen, liquid crystal display/LCD, light emitting diode/LED display), an external display 125 (e.g., touch screen, LCD, LED display), a network controller 126 (e.g., wired and/or wireless), and a mass storage 128 (e.g., hard disk drive/HDD, optical disc, solid-state drive/SSD, flash memory, etc.). The system 110 may also include a graphics processor 120 (e.g., graphics processing unit/GPU) that is incorporated with the host processor 112 and the IO module 118 into a system on chip (SoC) 130. The computing system 110 also includes a battery 134 that provides a battery output.

In one example, the host processor 112 executes instructions 132 (e.g., OS driver instructions) retrieved from the system memory 116 and/or the mass storage 128, wherein execution of the instructions 132 causes the host processor 112 and/or the computing system 110 to implement one or more aspects of the method 30 (FIG. 2), the method 40 (FIG. 3) and/or the method 60 (FIG. 4), already discussed. Thus, execution of the instructions 132 causes the host processor 112 to detect a connection of the external display 125 to the computing system 110 and activate frame buffer compression for the external display 125 if one or more conditions are satisfied. As already noted, the condition(s) may include, for example, a lid of the computing system 110 being closed, a resolution of the external display 125 being greater than a resolution of the internal display 124 and/or frame buffer compression being supported by the external display 125.

Figure 6:
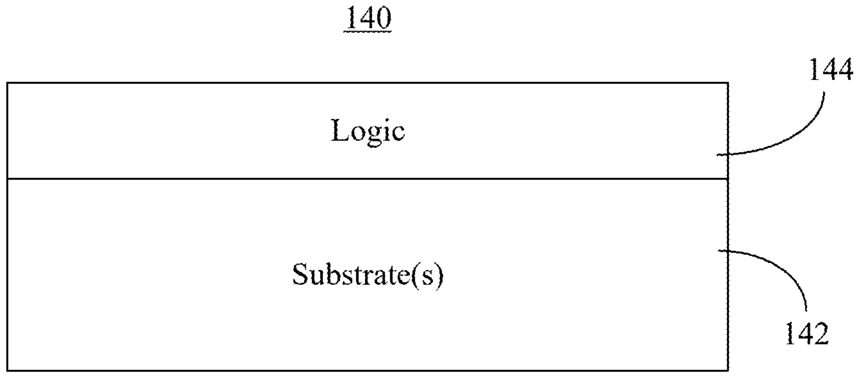
FIG. 6 is an illustration of an example of a semiconductor package apparatus according to an embodiment.

FIG. 6 shows a semiconductor apparatus 140 (e.g., chip and/or package). The illustrated apparatus 140 includes one or more substrates 142 (e.g., silicon, sapphire, gallium arsenide) and logic 144 (e.g., transistor array and other integrated circuit/IC components) coupled to the substrate(s) 142. In an embodiment, the logic 144 implements one or more aspects of the method 30 (FIG. 2), the method 40 (FIG. 3) and/or the method 60 (FIG. 4), already discussed.

The logic 144 may be implemented at least partly in configurable or fixed-functionality hardware. In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

ADDITIONAL NOTES AND EXAMPLES

Example 1 includes a performance-enhanced computing system comprising an internal display, a processing unit, and a memory coupled to the processing unit, the memory including a set of instructions, which when executed by the processing unit, cause the processing unit to detect a connection of an external display to the computing system and activate frame buffer compression for the external display if one or more conditions are satisfied.

Example 2 includes the computing system of Example 1, wherein the one or more conditions include a lid of the computing system being closed.

Example 3 includes the computing system of Example 1, wherein the one or more conditions include a resolution of the external display being greater than a resolution of the internal display.

Example 4 includes the computing system of Example 1, wherein the one or more conditions include frame buffer compression being supported by the external display.

Example 5 includes the computing system of Example 4, wherein the instructions, when executed, further cause the processing unit to confirm that frame buffer compression is supported by the external display based on billboard class information associated with the external display.

Example 6 includes the computing system of any one of Examples 1 to 5, wherein to activate frame buffer compression for the external display, the instructions, when executed, further cause the processing unit to deallocate a display pipe from the internal display, wherein frame buffer compression is enabled for the display pipe, and allocate the display pipe to the external display.

Example 7 includes at least one computer readable storage medium comprising a set of instructions, which when executed by a computing system, cause the computing system to detect a connection of an external display to a computing system containing an internal display, and activate frame buffer compression for the external display if one or more conditions are satisfied.

Example 8 includes the at least one computer readable storage medium of Example 7, wherein the one or more conditions include a lid of the computing system being closed.

Example 9 includes the at least one computer readable storage medium of Example 7, wherein the one or more conditions include a resolution of the external display being greater than a resolution of the internal display.

Example 10 includes the at least one computer readable storage medium of Example 7, wherein the one or more conditions include frame buffer compression being supported by the external display.

Example 11 includes the at least one computer readable storage medium of Example 10, wherein the instructions, when executed, further cause the computing system to confirm that frame buffer compression is supported by the external display based on billboard class information associated with the external display.

Example 12 includes the at least one computer readable storage medium of any one of Examples 7 to 11, wherein to activate frame buffer compression for the external display, the instructions, when executed, further cause the computing system to deallocate a display pipe from the internal display, wherein frame buffer compression is enabled for the display pipe, and allocate the display pipe to the external display.

Example 13 includes a semiconductor apparatus comprising one or more substrates, and logic coupled to the one or more substrates, wherein the logic is implemented at least partly in one or more of configurable or fixed-functionality hardware, the logic to detect a connection of an external display to a computing system containing an internal display, and activate frame buffer compression for the external display if one or more conditions are satisfied.

Example 14 includes the semiconductor apparatus of Example 13, wherein the one or more conditions include a lid of the computing system being closed.

Example 15 includes the semiconductor apparatus of Example 13, wherein the one or more conditions include a resolution of the external display being greater than a resolution of the internal display.

Example 16 includes the semiconductor apparatus of Example 13, wherein the one or more conditions include frame buffer compression being supported by the external display.

Example 17 includes the semiconductor apparatus of Example 16, wherein the logic is to confirm that frame buffer compression is supported by the external display based on billboard class information associated with the external display.

Example 18 includes the semiconductor apparatus of any one of Examples 13 to 17, wherein to activate frame buffer compression for the external display, the logic is to deallocate a display pipe from the internal display, wherein frame buffer compression is enabled for the display pipe, and allocate the display pipe to the external display.

Example 19 includes a method of operating a performance-enhanced computing system, the method comprising detecting a connection of an external display to a computing system containing an internal display, and activating frame buffer compression for the external display if one or more conditions are satisfied.

Example 20 includes the method of Example 19, wherein the one or more conditions include a lid of the computing system being closed.

Example 21 includes the method of Example 19, wherein the one or more conditions include a resolution of the external display being greater than a resolution of the internal display.

Example 22 includes the method of Example 19, wherein the one or more conditions include frame buffer compression being supported by the external display.

Example 23 includes the method of Example 22, further including confirming that frame buffer compression is supported by the external display based on billboard class information associated with the external display.

Example 24 includes the method of any one of Examples 19 to 23, wherein activating frame buffer compression for the external display includes deallocating a display pipe from the internal display, wherein frame buffer compression is enabled for the display pipe, and allocating the display pipe to the external display.

Example 25 includes an apparatus comprising means for performing the method of any one of Examples 19 to 24.

Technology described herein therefore enhances OS driver policy by dynamically allocating FBC capable display pipes to USB-C alternate mode or USB-C THUNDERBOLT mode as higher priority with informed feedback when the USB-C display is connected to client platform. For example, when a USB4 or THUNDERBOLT display is connected to a port, the technology parses the alternate/THUNDERBOLT modes from the class descriptor information of the enumerated display device. The technology then provides the parsed information as feedback to an OS driver policy that instructs a display digital interface (DDI) to allocate an FBC capable display pipe or dynamically switch to an FBC capable display pipe for the external USB-C display.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:

an internal display;

a processing unit; and a memory coupled to the processing unit, the memory including a set of instructions, which when executed by the processing unit, cause the processing unit to:

detect a connection of an external display to the computing system, and activate frame buffer compression for the external display if one or more conditions are satisfied by deallocating a display pipe from the internal display, wherein frame buffer compression is enabled for the display pipe, and allocating the display pipe to the external display.

2. The computing system of claim 1, wherein the one or more conditions include a lid of the computing system being closed.

3. The computing system of claim 1, wherein the one or more conditions include a resolution of the external display being greater than a resolution of the internal display.

4. The computing system of claim 1, wherein the one or more conditions include frame buffer compression being supported by the external display.

5. The computing system of claim 4, wherein the instructions, when executed, further cause the processing unit to confirm that frame buffer compression is supported by the external display based on billboard class information associated with the external display.

6. At least one non-transitory computer readable storage medium comprising a set of instructions, which when executed by a computing system, cause the computing system to:

detect a connection of an external display to a computing system containing an internal display; and activate frame buffer compression for the external display if one or more conditions are satisfied by deallocating a display pipe from the internal display, wherein frame buffer compression is enabled for the display pipe, and allocating the display pipe to the external display.

7. The at least one computer readable storage medium of claim 6, wherein the one or more conditions include a lid of the computing system being closed.

8. The at least one computer readable storage medium of claim 6, wherein the one or more conditions include a resolution of the external display being greater than a resolution of the internal display.

9. The at least one computer readable storage medium of claim 6, wherein the one or more conditions include frame buffer compression being supported by the external display.

10. The at least one computer readable storage medium of claim 9, wherein the instructions, when executed, further cause the computing system to confirm that frame buffer compression is supported by the external display based on billboard class information associated with the external display.

11. A semiconductor apparatus comprising:

one or more substrates; and logic coupled to the one or more substrates, wherein the logic is implemented at least partly in one or more of configurable or fixed-functionality hardware, the logic to:

detect a connection of an external display to a computing system containing an internal display;

activate frame buffer compression for the external display if one or more conditions are satisfied, wherein the one or more conditions include frame buffer compression being supported by the external display; and confirm that frame buffer compression is supported by the external display based on billboard class information associated with the external display.

12. The semiconductor apparatus of claim 11, wherein the one or more conditions include a lid of the computing system being closed.

13. The semiconductor apparatus of claim 11, wherein the one or more conditions include a resolution of the external display being greater than a resolution of the internal display.

14. The semiconductor apparatus of claim 11, wherein to activate frame buffer compression for the external display, the logic is to:

deallocate a display pipe from the internal display, wherein frame buffer compression is enabled for the display pipe; and allocate the display pipe to the external display.

15. A method comprising:

detecting a connection of an external display to a computing system containing an internal display; and activating frame buffer compression for the external display if one or more conditions are satisfied, wherein activating frame buffer compression for the external display includes:

deallocating a display pipe from the internal display, wherein frame buffer compression is enabled for the display pipe; and allocating the display pipe to the external display.

16. The method of claim 15, wherein the one or more conditions include a lid of the computing system being closed.

17. The method of claim 15, wherein the one or more conditions include a resolution of the external display being greater than a resolution of the internal display.

18. The method of claim 15, wherein the one or more conditions include frame buffer compression being supported by the external display.

19. The method of claim 18, further including confirming that frame buffer compression is supported by the external display based on billboard class information associated with the external display.

* * * * *